United States Patent Office 2,751,713
Patented June 26, 1956

2,751,713
SYSTEMIC INSECTICIDES

Walter W. Abramitis, Downers Grove, Ill., assignor to Armour and Company, Chicago, Ill., a corporation of Illinois No Drawing. Application May 6, 1952,
Serial No. 286,423

17 Claims. (Cl. 47—58)

This invention relates to systemic insecticides, and more particularly to the use of tetraalkylammonium salts as systemic insecticides. Systemic insecticides can be defined as chemical agents which when introduced into the sap of growing plants are accepted by the plants as "pseudo-metabolites" and translocated throughout the plant system, and thereby result in increasing the resistance of the plants to attack by insects, either by increasing the toxicity or repellency of the plant juices to insect pests.

The concept of systemic insecticides is of relatively recent origin. However, the potential advantages of systemic insecticides over other types of insecticides is so great that a widespread search has been and is being made for chemical compounds displaying systemic insecticidal properties. One of the advantages which effective systemic insecticides might possess is that the problem of evenly distributing the insecticidal compounds on the plant surfaces would be substantially alleviated. In other words, by applying the compounds to the absorptive surfaces of the plants, the plant would absorb and automatically produce an even distribution of the chemicals throughout the plant tissues. This absorption and redistribution process would also tend to prevent damage to the contacted plant surfaces by an undue accumulation of the chemicals thereon. A further advantage of systemic insecticides would be that they would not be washed off by rain or blown off by wind, etc. and thus the persistence of the insecticides after one application would be increased. Perhaps an even greater advantage would be that the new plant growth developing after the application of insecticides might be rendered toxic or repellent to insect pests by the same process as that achieving the original redistribution within the plant system.

It is therefore an object of this invention to provide chemical compounds which have systemic insecticidal properties in a marked degree, and can therefore be used with the consequent advantages described above. Further objects and advantages of this invention will appear as the specification proceeds.

It has been discovered that the tetraalkylammonium salts and particularly the halide salts possess substantial systemic insecticidal properties. The investigations leading to this invention indicate that the systemic insecticidal properties of the tetraalkylammonium salts depend in part on the number of carbon atoms in the alkyl groups of these compounds. It appears probable that when one or more of the alkyl groups contain more than eight carbon atoms that the compounds do not display appreciable systemic properties. Preferably, all the alkyl groups should contain less than five carbon atoms. I have found that the symmetrical tetraalkylammonium salts and particularly the halide salts having less than five carbon atoms have excellent systemic insecticidal properties. The tetraalkylammonium halides, and particularly the chloride and bromide, appear to be the best of the compounds investigated from the standpoint of the degree of increase in the resistance of the plants to insect attack without damaging the plant because of phytotoxicity. The tetrapropyl and tetrabutyl compounds appear to be slightly more phytotoxic than the tetramethyl, but at the same time appear to have weaker systemic insecticidal properties. The tetraethyl compound has been found to be somewhat less effective than the tetramethyl compound, but it also possesses desirable properties. As between the bromide, chloride, and iodide salts, the bromides appear to have the most desirable properties, although the chlorides have very similar properties. Trimethylethylammonium halides, and particularly the chloride and bromide salts, also give good results.

It is believed that the systemic insecticidal properties of the tetraalkylammonium salts are due primarily to the cationic portion of the molecule, that is, the tetraalkylammonium ion. The anionic portion of the molecule or more specifically the salt ion is of lesser importance, except that in order to realize the systemic insecticidal properties of the cationic portion of the molecule, it is necessary that the anionic portion be relatively non-toxic to the plants treated. A large number of inorganic anions fulfill these requirements in addition to the members of the halogen family. For example, phosphate, sulfate, and nitrate salts can be employed. In addition, organic anions can be employed. In particular, fatty acid salts may be used, including lower fatty acid salts such as acetate salts and higher fatty acid salts such as stearate salts.

In general, the method of using the tetramethylammonium salts as systemic insecticides involves their application in measured quantities to the absorptive surfaces of the growing plants. For practically all plants, the main absorptive surfaces are found on the leaves and on the roots, or more particularly the feed roots. However, there are substantial advantages to be obtained by introducing the systemic insecticidal agents of this invention through the roots. The plant juices tend to move in a generally upward direction from the roots to the uppermost parts of the plants. It has been found that when the systemic insecticidal compounds of this invention are introduced through the roots that the new growth of the plants is effectively immunized even though the new growth is primarily a lateral extension of the plant. This immunization of all of the new growth is especially desirable since the new growth is the tenderest part of the plant structure and therefore especially vulnerable to insect attack. Another advantage of introducing the systemic insecticidal compounds through the roots is that the compounds can be mixed with the soil surrounding the roots from which the compounds are gradually absorbed together with water and other nutrient materials by the feed roots. Thus, in effect the insecticidal compounds are metered to the plants as required without an excessive amount being supplied at any one time, which results in the immunity of the plant being sustained over long periods of time.

Any suitable means can be employed for contacting the absorptive root surfaces with the compounds employed in the method of this invention. In general, the compounds should be introduced into the soil so as to be present within the feed root range of a growing plant. For example, a minor proportion by weight of the compounds can be mixed with the soil either before or after the plants have started to grow. The exact proportion to be employed, particularly if the compounds are mixed in solid form with the soil, will depend on the length of time that it is desired for the increased resistance of the plants to persist, and also on how much of the chemicals the particular plants can absorb without being damaged, as well as on other factors. In general, at least .25 gram of the compounds per 1000 grams of soil within the feed root range of the plants should be employed. Preferably, at least .5 gram per 1000 grams of soil within the feed root range of the plants is used. Up to 1% or greater concentrations in soil can be used, but there is no particular advantage to such high concentrations, and some plants may be damaged. The period over which the plants remain toxic or repellent to insects will depend on the time of year and the physiological activity of the plants. However, even with actively growing plants, the period of toxicity can easily be prolonged for thirty days and beyond by the soil treatment method described.

Most of the tetraalkylammonium salts are quite hygroscopic, and tend to remain sticky. This somewhat complicates the application of the dry compounds, since it is necessary to thoroughly mix the compounds with the soil in order to obtain a good distribution of the compounds in the soil. Therefore, it is preferable to first disperse the insecticidal compounds in a liquid or solid carrier. Solid carriers are preferred for soil treatment, although liquid carriers such as water can be used. Any of the usual solid carriers for insecticidal compounds can be used. For example, talc and various types of clays are desirable. It has been found that bentonite clays react with the tetraalkylammonium compounds to produce an addition salt which can be designated as tetraalkylammonium bentonite. The bentonite salt of the insecticidal compounds is free-flowing and combines easily with soil. Therefore, bentonite is a particularly desirable carrier for the insecticidal compounds. Further, because of the addition complex formed with bentonite, it is probable that the compounds remain somewhat longer in the soil and are more gradually absorbed by the plants. The concentration of the insecticidal compounds in the solid carrier is not especially critical. Concentrations from 10 to 50% can be employed, and good results are obtained with concentrations of around 25%.

It has also been discovered that the insecticidal compounds of this invention can be incorporated in commercial fertilizer compositions, and that the desired immunizing effects on the plants are obtained when the fertilizer compositions containing the insecticidal compounds are applied to the soil. There does not seem to be any evidence to indicate that the components of the fertilizer compositions interfere with the action of the insecticidal compounds. The standard commercial fertilizer compositions referred to are those which contain as principal ingredients compounds providing nitrogen, phosphoric acid and potash. For example, the nitrogen may be provided by nitrate salts or ammonium salts. In many cases ammonium nitrate is employed. Phosphoric acid may be provided by ground phosphate rock, superphosphate, and triple phosphate. Potash may be provided by various potassium salts such as potassium chloride, sulfate, nitrate, etc. In general, since it will be desired to apply somewhat greater concentration of the fertilizer composition to the soil, less than 1 part by weight of the insecticidal compounds should be combined with the fertilizer composition. For example, 1 part by weight of a tetraalkylammonium halide can be combined with 4 parts by weight of a 5–10–10 fertilizer composition containing as the principal ingredients ammonium sulfate, superphosphate, and potassium chloride.

Some tetraalkylammonium salts having the desired systematic insecticidal properties and falling within the scope of this invention are of a relatively non-sticky character. Specifically, the higher saturated fatty acid salts have this desirable property. For example, the tetraalkylammonium palmitate and stearate salts are especially desirable because of their non-sticky character, which permits them to be readily combined with soil without the need for first distributing them in a carrier.

Another convenient way of introducing the compounds into the soil is by applying an aqueous solution of these compounds to the soil. The application of aqueous solutions to the soil within the feed root range leads to rapid absorption of the chemicals by the plants. In fact, when the insecticidal compounds are applied in aqueous solutions to the soil, the plants growing in the treated soil may become effectively immunized within 24 hours. When the solid insecticidal compounds are mixed with the soil, usually from 2 to 3 days are required for the plants to absorb sufficient amount of the insecticidal compounds to reach their maximum immunity. Aqueous solutions of the insecticidal compounds for treating soil containing growing plants should contain at least .1% and preferably .5% by weight of the insecticidal compounds. Good results are obtained with 1% aqueous solutions. However, if it is desired to prolong the systemic effect of the compounds, greater concentrations can be used.

In investigation of the systemic insecticidal properties of the tetraalkylammonium salts leading to this invention, it has been found that these compounds are effective in both increasing the toxicity and the repellency of the plant juices to many insects. These compounds have been found to be particularly effective in immunizing the plants against attack by sucking insects such as aphids. However, they have also been found to be effective against many other types of insects. Among the plants investigated, the members of the bean and pea families have been found to be given a greatly increased degree of resistance to insecticidal attack by the absorption of the compounds through the roots.

In order that the value and the methods of use of the tetraalkylammonium salts can be fully appreciated, it is desired to set forth the following examples.

Example I

The test chemicals were mixed and ground in a ball mill with an inert carrier consisting of a Pyrax and Attaclay in an 80/20 weight ratio. A sufficient quantity of the ground and mixed materials was then added to each 1000 grams of soil in either 2.0, 1.0, or 0.5 gram proportions. The treated soil was then placed in a series of pots in which the seeds of Broad Windsor beans were planted. When the plants had reached a height of 2", untreated pea aphids in the wingless adult stage were confined upon them for 72 hours, at which time observations were made. The results are reported in the following table:

| Material | Grams per 1,000 gms. soil | Elapsed time since treatment—16 days ||||||
|---|---|---|---|---|---|---|---|
| | | No. Adults | No. Dead | Total No. Adults | Total No. Dead | Per cent Dead | Plant Injury |
| Tetramethylammonium Bromide | 2.0 | 10, 12, 6 | 10, 12, 4 | 28 | 26 | 92.8 | None. |
| | 1.0 | 6, 8, 7 | 0, 6, 4 | 21 | 10 | 47.6 | None. |
| | 0.5 | 11, 12, 10 | 3, 6, 2 | 33 | 11 | 33.3 | None. |
| Tetramethylammonium Chloride | 2.0 | 14, 8, 4 | 14, 8, 4 | 26 | 26 | 100.0 | None. |
| | 1.0 | 6, 6, 5 | 4, 4, 1 | 17 | 9 | 52.9 | None. |
| | 0.5 | 10, 5, 4 | 7, 0, 3 | 19 | 10 | 52.6 | None. |
| Check Untreated | 0 | 8, 10 | 0, 1 | 18 | 1 | 5.5 | None. |

Example II

The procedure of Example I was repeated, except that

Perfection pea seeds were planted in the pots. The results are reported in the following table:

| Material | Grams per 1,000 gms. soil | Elapsed time since treatment—13 days | | | | | |
|---|---|---|---|---|---|---|---|
| | | No. Adults | No. Dead | Total No. Adults | Total No. Dead | Percent Dead | Plant Injury |
| Tetramethylammonium Bromide | 2.0 | 9, 7, 9, 5, 5 | 9, 7, 0, 4, 0 | 30 | 20 | 66.6 | None. |
| | 1.0 | 13, 5, 6, 7, 16 | 13, 5, 2, 5, 3 | 29 | 20 | 68.9 | None. |
| | 0.5 | 7, 7, 9, 13, 10 | 3, 0, 6, 11, 9 | 37 | 11 | 29.7 | None. |
| Tetramethylammonium Chloride | 2.0 | 6, 7, 5, 11, 9 | 5, 7, 3, 8, 6 | 38 | 31 | 81.5 | None. |
| | 1.0 | 7, 9, 5, 6, 8 | 6, 9, 3, 5, 0 | 32 | 24 | 75.0 | None. |
| | 0.5 | 12 | 2 | 27 | 23 | 85.1 | None. |
| Check Untreated | 0 | | | 20 | 2 | 10.0 | None. |

Example III

The identical plants used in the experiments reported in Example II were reinfested 21 days after the planting of the Perfection pea seeds with pea aphids in the wingless adult stage. At the end of 72 hours observations were made to determine the continuing toxicity of the plants to the insects. Substantially all of the pea aphids were found to be dead, and there was no discernible injury to the plants.

Example IV

Broad Windsor bean plants employed in Example I were reinfested with a large number of pea aphids in the wingless adult stage thirty-one days after the planting of the seeds. At the end of seventy-two hours the following observations were made:

| Material | Percent Conc. | Infested 31 days after treatment—Elapsed time since treatment—34 days | | | | | |
|---|---|---|---|---|---|---|---|
| | | No. Adults | No. Dead | Total No. Adults | Total No. Dead | Percent Dead | Plant Injury |
| Tetramethylammonium Bromide | 2.0 | 14, 9 | 12, 9 | 23 | 21 | 91.3 | None. |
| | 1.0 | 10, 9 | 9, 8 | 19 | 17 | 89.4 | None. |
| | 0.5 | 13, 10 | 10, 7 | 23 | 17 | 73.9 | None. |
| Tetramethylammonium | 2.0 | 10, 10 | 10, 10 | 20 | 20 | 100.0 | None. |
| | 1.0 | 10, 8 | 3, 8 | 18 | 11 | 61.1 | None. |
| | 0.5 | 14, 29 | 4, 6 | 43 | 10 | 23.2 | None. |
| Check | 0 | 10 | 1 | 10 | 1 | 10.0 | None. |

Example V

An additional experiment was run to determine the effectiveness of introducing tetramethylammonium bromide into the soil in aqueous solution. The pots contained healthy pea plants of the Blue Bantam variety planted in approximately 500 grams of soil per pot. Aqueous solutions of tetramethylammonium bromide were made up in concentrations of 0.75, 0.5, 0.25, and 0.1% by weight. 100 mm. of each of the different concentrations of solution were poured into a number of separate pots. The plants were heavily infested with pea aphids. At the end of two days it was observed that 75 to 100% of the aphids were killed on the plants in the pots receiving the .5 and .75% solutions. On the plants receiving the .25 and .1% solutions there was about 25% kill or less.

At the end of seven days the plants were heavily reinfested with pea aphids, and at the end of ten days observations were made. On the plants receiving the .75% solutions there was 100% control, all of the aphids being killed. On the plants receiving the .5% solutions the kill averaged from 75 to 95%, while on the other plants receiving the more dilute solutions a lesser percent. kill was observed.

Example VI

The procedure of Example V was followed in testing the efficiency of tetramethylammonium chloride and tetramethylammonium iodide when applied to the soil in aqueous solutions, except that the tests were discontinued at the end of three days. At concentrations greater than .25% both tetramethylammonium chloride and tetramethylammonium iodide were found to make the plant juices toxic to aphids. The plants were unharmed by the tetramethylammonium chloride, but some plant injury was noted from the tetramethylammonium iodide in its higher concentrations.

Example VII

The procedure of Example V was followed to determine the effectiveness of tetra-n-propylammonium iodide and tetra-n-butylammonium iodide, the tests being discontinued after three days as in Example VI. Both compounds at concentrations greater than .1 were found to have systemic insecticidal properties. However, they were also found to be somewhat more injurious to the plants than tetramethylammonium iodide.

Example VIII

A large number of potted cabbage plants (Marion Market variety) were infested with green peach aphids (*Myzus persicae*). Aqueous solutions of tetramethylammonium bromide and tetramethylammonium chloride were prepared in concentrations of 1.0, 0.5, 0.25, and 0.1% by weight. The various solutions were then applied to the soil surrounding individual cabbage plants in 100 mm. quantities. For both compounds at concentrations of 0.25% or greater after seven days the aphids were reduced in number by over 50%, and at the end of ten days the average percent. kill was between 75 and 95%.

Example IX 100 mm. solutions of tetraethylammonium bromide having either .75, 0.5, 0.25 or 0.1% concentrations were applied to the soil within the feed range of a number of pea plants (Blue Bantam variety). The plants were then infested with pea aphids. At the end of seven days, at concentrations greater than .25%, at least 50% of the aphids had been killed, and at the end of ten days substantially all of the aphids had been killed.

Example X

Potted cranberry bean plants were each watered with 100 mm. of an aqueous solution of either tetramethylammonium bromide or tetramethylammonium chloride in concentrations of both 1.0 and 0.5%. After 24 hours five Mexican bean beetles in their third instar stage were confined on each plant. Seventy-two hours later the plants were observed, and it was found that from 25 to 50% of the insects had been killed.

While in the foregoing specification, there have been set forth specific details of a method of increasing the resistance of growing plants to attack by insects, it will be apparent to those skilled in the art that many of these details can be varied widely without departing from the spirit of this invention.

I claim:

1. A method of increasing the resistance of growing plants to attack by insects characterized by having present in the soil within the feed root range of said plants a tetraalkylammonium salt having less than 5 carbon atoms in each of its alkyl groups selected from the group consisting of the halide and fatty acid salts thereof.

2. A method of increasing the resistance of growing plants to attack by insects characterized by having present in the soil within the feed root range of said plants a tetraalkylammonium halide having less than 5 carbon atoms in each of its alkyl groups.

3. A method of increasing the resistance of growing plants to attack by insects characterized by having present in the soil within the feed root range of said plants a tetraalkylammonium halide selected from the group consisting of tetraalkylammonium chlorides and tetraalkylammonium bromides, said tetraalkylammonium halide having less than 5 carbon atoms in each of its alkyl groups.

4. The method of increasing the resistance of growing plants to attack by insects characterized by having present in the soil within the feed root range of said plants a compound selected from the group consisting of tetramethylammonium chloride, bromide, and iodide, said compound having less than 5 carbon atoms in each of its alkyl groups.

5. The method of increasing the resistance of growing plants to attack by insects characterized by having present in the soil within the feed root range of said plants a compound selected from the group consisting of trimethylethylammonium chloride, bromide, and iodide, said compound having less than 5 carbon atoms in each of its alkyl groups.

6. In a method of increasing the resistance of growing plants to attack by insects, the step of applying to the soil within the feed root range of a growing plant at least .5 grams of tetraalkylammonium halide per 1000 grams of soil, said tetraalkylammonium halide containing less than 5 carbon atoms in each of its alkyl groups.

7. In a method of increasing the resistance of growing plants to attack by insects, the steps of mixing with the soil a tetraalkylammonium halide having less than 5 carbon atoms in each of its alkyl groups, and growing plants in said treated soil.

8. In a method of increasing the resistance of growing plants to attack by aphids and the like, the steps of introducing into soil at least .5 grams of a tetraalkylammonium halide per 1000 grams of soil, said tetraalkylammonium halide having less than 5 carbon atoms in each of its alkyl groups, and growing plants in said soil.

9. A method of increasing the resistance of bean and pea plants to aphids and the like characterized by having present in the soil within the feed root range of said plants a tetraalkylammonium halide having less than 5 carbon atoms in each of its alkyl groups.

10. A method of increasing the resistance of bean and pea plants to aphids and the like characterized by having present in the soil within the feed root range of said plants a tetraalkylammonium halide having less than 5 carbon atoms in each of its alkyl groups, said tetraalkylammonium halide being selected from the group consisting of tetramethylammonium chloride, bromide, and iodide.

11. In a method of increasing the resistance of growing plants to attack by insects, the steps of mixing with soil an insecticidal composition comprising a tetraalkylammonium halide distributed in a solid carrier wherein it is water-soluble, said tetraalkylammonium halide having less than 5 carbon atoms in each of its alkyl groups.

12. The method of claim 11 in which said solid carrier consists principally of a bentonite clay.

13. In a method of increasing the resistance of growing plants to attack by insects, the step of applying to the soil within the feed root range of said plants an aqueous solution of a tetraalkylammonium halide having less than 5 carbon atoms in each of its alkyl groups.

14. In a method of increasing the resistance of growing plants to attack by insects, the steps of mixing with soil a compound selected from the group consisting of a tetraalkylammonium palmitate and a tetraalkylammonium stearate, said compound having less than 5 carbon atoms in each of its alkyl groups, and growing plants in said soil.

15. In a method of increasing the resistance of growing plants to attack by insects, the steps of mixing with soil a fertilizer composition containing in addition to the plant nutrients therein a tetraalkylammonium halide having less than 5 carbon atoms in each of its alkyl groups, said halide being in a water-soluble state in said fertilizer composition, and growing plants in the soil thus treated.

16. The method of claim 15 in which said fertilizer composition contains at least one compound providing nutrient nitrogen, at least one compound providing nutrient phosphoric acid, and at least one compound prociding nutrient potassium.

17. A soil-treating composition consisting of a mixture of a fertilizer composition and a tetraalkylammonium halide having less than 5 carbon atoms in each of its alkyl groups, said halide being in a water-soluble state in said fertilizer composition.

References Cited in the file of this patent

UNITED STATES PATENTS

| | | |
|---|---|---|
| 1,976,905 | Thordarson | Oct. 16, 1934 |
| 2,095,366 | Marsico | Oct. 12, 1937 |
| 2,271,378 | Searle | Jan. 27, 1942 |
| 2,666,010 | Stayner | Jan. 12, 1954 |

OTHER REFERENCES

Chemistry of Insecticides, Fungicides and Herbicides, Frear, 2nd ed., D. Van Nostrand Co. Inc. (pages 94–95).

Zimmerman: "Comparative Effectiveness . . ." published 1937 in Contributions from Boyce Thompson Institute, vol. 8, No. 5, pages 337 through 350.